United States Patent [19]

Wilson

[11] 3,711,770
[45] Jan. 16, 1973

[54] RESISTANCE-CAPACITANCE METER
[75] Inventor: Homer M. Wilson, Houston, Tex.
[73] Assignee: Petrolite Corporation, St. Louis, Mo.
[22] Filed: July 19, 1971
[21] Appl. No.: 163,792

Related U.S. Application Data

[62] Division of Ser. No. 849,734, Aug. 15, 1969, Pat. No. 3,616,417.

[52] U.S. Cl. .................................................324/57 R
[51] Int. Cl. ..............................................G01r 27/00
[58] Field of Search.......................324/71, 65, 60, 57

[56] References Cited

UNITED STATES PATENTS

3,616,417  10/1971  Wilson.............................324/71 R

Primary Examiner—Alfred E. Smith
Attorney—Emil J. Bednar et al.

[57] ABSTRACT

A meter for measuring electrical characteristics of a load including resistance R and capacitance C with metallic electrodes contactable by an aqueous liquid, including a test specimen electrode, a reference electrode and a third or auxiliary electrode. A current loop circuit connects the test specimen and third electrodes to a first input and common output of a differential amplifier and a direct current supply means. Polarizing current in the current loop circuit passes through the third electrode and the test specimen electrode to produce an exponential voltage change at the test specimen electrode with a time constant of resistance and capacitance about this electrode. A voltage loop circuit connects the test specimen electrode and the reference electrode between the first and second inputs of the differential amplifier. A signal generating source in the voltage loop circuit produces a voltage signal changing exponentially from a first value to a second value with the resistance-capacitance time constant characteristic of the polarizing voltage change at the test specimen electrode. The voltage signal and polarizing voltage change combine as an input signal across the first and second inputs of the differential amplifier to produce the polarizing current flow in the current loop circuit at a substantially constant value until a predetermined polarizing voltage is generated at the test specimen electrode. Means provide a read-out of the constant value of current flow through the test specimen electrode and the third electrode while the voltage signal is changing exponentially. The value of current flow can be correlated to the electrical characteristics at the test specimen electrode.

2 Claims, 6 Drawing Figures

Homer M. Wilson
INVENTOR

BY Emil J. Bednar
ATTORNEY

Fig. 6

RESISTANCE-CAPACITANCE METER

This is a divisional application of Ser. No. 849,734 filed Aug. 15, 1969 now U.S. Pat. No. 3,616,417.

BACKGROUND OF THE INVENTION

1. Field of the Invention

This invention relates to measuring and testing electro-chemical processes and it relates particularly to the instruments and electrical-chemical techniques used in the study of corrosion processes.

2. Description of the Prior Art

It is often desirable to determine the rates at which metals corrode within a corrodent such as a corrosive aqueous liquid. For example, corrosion inhibitors are added to aqueous liquids to reduce the corrosion of exposed metals by providing a protective film. Instruments are used to measure the rates at which these metals corrode so that the effectiveness of the inhibitor can be determined. The measurement of the rate of corrosion upon metals usually involves an instrument associated with a probe which carries a plurality of metallic electrodes immersed within the corrodent. These instruments are usually termed "corrosion ratemeters". The electrodes in the corrodent undergo certain electro-chemical changes that are related to the rate of corrosion of the metal forming the electrodes. Thus, the rate of corrosion can be correlated with the electro-chemical effects upon the metallic electrodes of a probe immersed in the corrosive liquid.

An electro-chemical process and apparatus, especially useful in measuring corrosion rates, is described in U.S. Pat. No. 3,406,101. In this patent, there is described a corrosion ratemeter which includes a probe having three electrodes adapted to be exposed to a corrodent such as a corrosive liquid, an adjustable current source, an ammeter and a high impedance voltmeter as primary components. The adjustable current source applies a small electric current between a "test" electrode and an "auxiliary" or third electrode. At the same time, the voltmeter monitors the polarization potential produced by current flow between the "test" electrode and a "reference" electrode. The current flow slightly polarizes the surface of the "test" electrode, and as a result, causes a shift in potential (polarization potential) between the "test" and "reference" electrodes. The current flow required to produce a certain polarization is directly proportional to the corrosion rate of the "test" electrode undergoing corrosion. Usually, the polarization potential is selected within the linear voltage corrosion rate environmental conditions and good results have been obtained with 10 millivolts polarization.

If the corrosion rate is low, a very small current flow will polarize the "test" electrode. If the corrosion rate is high, much more current flow is required to polarize the electrode. The weight of metal lost from the electrode (by electro-chemical corrosion) is directly proportional to the current flow in accordance with Faraday's Law. Thus, by use of appropriate constants and adjustments of the exposed surface area of the "test" electrode, the ammeter can be calibrated directly into any desired units of corrosion rate providing the surface area of the "test" electrode is kept constant. Obviously, the initial surface area of the electrode exposed to corrosion can be adjusted to the desired range. In order to provide symmetry of the probe, and for other reasons, the exposed surface area of all electrodes are usually made identical. Thus, if the electrodes are constructed identically of the same material, such as 10–20 mild steel, any of the electrodes may serve as the "auxiliary," "test" and "reference" functions in electro-chemical techniques for determining the rate of corrosion.

It has been found that in certain corrodents, the "test" electrode develops an environmental condition which provides substantial reactance consisting of "polarization" capacitance. As a result, current flow to this electrode produces an exponential change in polarization voltage, which change is a time constant function of the resistance and capacitance attributed to the "test" electrode. For example, the corrosion of a metallic substance creates, at the metal-solution interface, diffusion-barriers, films or layers of corrosion products, insoluble salts and gases which influence electro-chemical reactions. Consider the situation where an iron "test" electrode is in contact with a solution containing chloride ions. A layer of iron oxide is formed about the electrode. This layer consists of iron atoms bound by oxygen atoms into a tight lattice. Chloride ions enter the film to weaken the electrical bond in the lattice. As a result, iron ions are drawn off into solution. The iron electrode supplies additional ionic iron for the lattice in a process termed "corrosion."

There are believed to be two layers of different kinds of iron oxide in the lattice. The outer layer contains some hydrogen which is removed by the chloride solution. This hydrogen can be considered as a thin invisible film protecting the surface of the iron. The chloride ions penetrate this film to bring the iron into solution from the lattice.

It will be apparent that the "film" about a metal-solution interface associated with the "test" electrode has appreciable "polarization" resistance. Additionally, the film is a conductor-dielectric layer which has significant "polarization" capacitance. In a "test" electrode with considerable exposed surface area, the film appears to be formed of a series circuit of a plurality of paralleled resistance and capacitance components. As a result, the electro-chemical reaction about the metal exhibit reactance-induced variations in currents and voltages associated with this electrode. In particular, larger currents will flow in the film if the voltage across the layer is changed rapidly. This flow of large currents can change the character of the film, or even damage it.

Industry employs "filming" types of inhibitors to protect corrodible metal surfaces. These inhibitors enclose the corrodible surfaces exposed to a corrodent with a dielectric film of some significant thickness. The protection afforded by the inhibitor is related to the thickness, and the tenacity, with which the film covers the protected metal surface. Thus, a metal surface covered with an inhibitor film exhibits, in electrochemical mechanisms, very substantial impedance attributed to polarization resistance and substantial parallel polarization capacitance.

Electro-chemical techniques to determine corrosion rate required careful application to prevent erroneous results from the films surrounding the corroding metal surface. One electro-chemical technique passes a constant current flow to the "test" electrode and a measurement of the generated potential associated with this electrode is obtained. These variations in polarization potential can be correlated to the rate of corrosion of the metal exposed to the corrodent. In another electro-chemical technique, the metal "test" electrode is maintained at a constant polarization potential by varying current flow to it. The magnitude of current flow is correlated to the rate of corrosion of metal exposed to the corrodent. In either system, application of the electro-chemical technique with only polarization resistance at the "test" electrodes can provide accurate results but careful attention of the operator is required. However, if the "test" electrode has considerable reactance, especially at high capacitance values, the electro-chemical technique requires compensation for the impedance present since variations in current-voltage occur with an exponential time constant function related to the resistance-capacitance associated with the "test" electrode. For example, either electro-chemical technique can produce accurate results in measurement of corrosion rate but careful performance of the test over prolonged time periods are required to avoid time constant errors. Most especially, current flow to the "test" electrodes must be restricted to prevent film damage.

It is the purpose of the present invention to provide a meter, and electro-chemical technique for its operation, which provides accurate measurement of electrical characteristics of metal surfaces exposed to a corrodent (an aqueous liquid) irrespective of test electrode resistance and capacitance effects. This new meter produces, for practical purposes, instantaneous electro-chemical measurements by the casual operator. Additionally, the present invention provides a means for measurement of film thicknesses produced by corrosion, or by the addition of inhibitors for protecting metal surfaces by the resistance R and capacitance C at the test specimen electrode.

SUMMARY OF THE INVENTION

In accordance with this invention, there is provided a meter for measuring electrical characteristics of a load including resistance R and capacitance C wherein a circuit includes an electrical load with these characteristics. A potential generating source with a current supply means for providing an output current in response to an electrical input signal is connected to the circuit so that current flow produces an exponential voltage change in the load with a time constant of RC. Control means, including a signal generating source, provide an electrical signal to said potential generating means, which signal changes exponentially from a first value to a second value with the RC time constant characteristic of the load until a predetermined voltage is generated in the load. As a result, current flows from the potential generating source to the load at a substantially constant value. Means provide a read-out of the constant value of current flow indicative of the electrical characteristics of the load while the signal is changing exponentially.

DESCRIPTION OF SPECIFIC EMBODIMENTS

Figure 1:
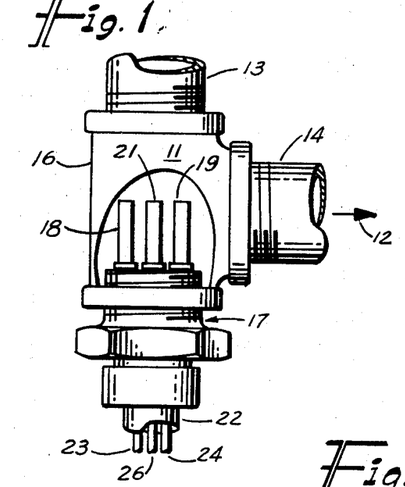
FIG. 1 is a perspective view illustrating a typical installation within a piping system of a probe for making measurements of electrical characteristics.

In FIG. 1, there is illustrated a piping system 11 which conveys a corrodent, such as an aqueous fluid, in the direction indicated by the arrow 12. The piping system 11 is composed of a pair of pipes 13 and 14 interconnected by a tee 16. A probe 17 is threaded into one end of the tee 16 to provide connection within the piping system 11. The probe 17 may be constructed of any suitable form, such as the structure illustrated in U. S. Pat. No. 3,406,101. The probe 17 contains a metallic body, which may be formed of a pipe plug, carrying three electrodes 18, 19 and 21 electrically isolated from the body. A cable 22 connects at one end of the probe 17 to provide electrical connections to the electrodes by conductors 23, 24 and 26. Preferably, the electrodes 18, 19 and 21 are structurally identical for purposes of electro-chemical techniques. For example, the electrodes 19, 21 and 18 may provide "reference," "test" and "auxiliary" or "third" electrode functions, respectively. For example, considering the electrode 21 as the test specimen electrode, the determination of the corrosion rate of steel would require this electrode to be made of steel.

Figure 2:
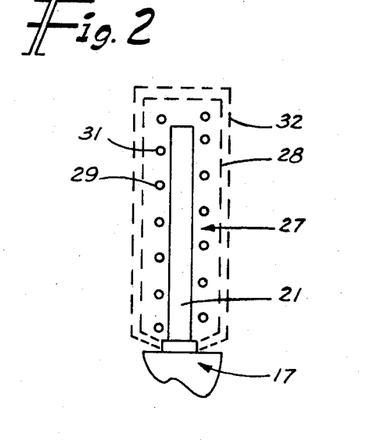
FIG. 2 is an enlarged perspective view of one electrode of the probe shown in FIG. 1.

During measurements of the fluid in the piping system 11, the test specimen electrode 21 can develop a film which has significant capacitance effects. Referring to FIG. 2, this film 27 is represented by a dashed line 28 enclosing the electrode 21. As mentioned previously, the film is formed of various substance which include the positive ions 29 of the corroding metal and the negative ions 31 of the corrodent effecting corrosion of the electrode 21. Additionally, where inhibitors are added to the corrodent to protect metallic surfaces, the film 27 may be surrounded by a second film 32 of the inhibitor. Thus, the films about the electrode 27 can provide substantial magnitudes of resistance and capacitance effects which must be taken into consideration with electro-chemical techniques for determining rate of corrosion of the electrode 21.

Figure 3:
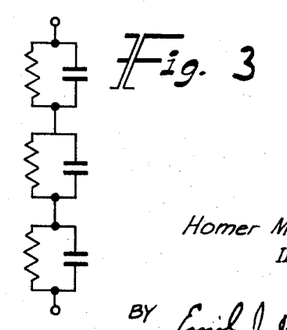
FIG. 3 is an electrical representation of electro-chemical films formed about the electrode illustrated in FIG. 2.

It is believed that in extended metal surfaces exposed to a corrodent, such as the "test" electrode 21, the resistance and capacitance may be better electrically represented by the circuitry illustrated in FIG. 3. The total resistance and capacitance about the electrode 21 is believed to be provided by a series circuit of several resistance-parallel capacitance components. As mentioned previously, application of excessive currents can rupture or reorientate the films surrounding the electrode 21. Electro-chemical techniques, for determining accurately, electro-chemical characteristics about the electrode 21 require no application of current sufficient to alter the film 27 (or film 28) surrounding the electrode 21.

Figure 4:
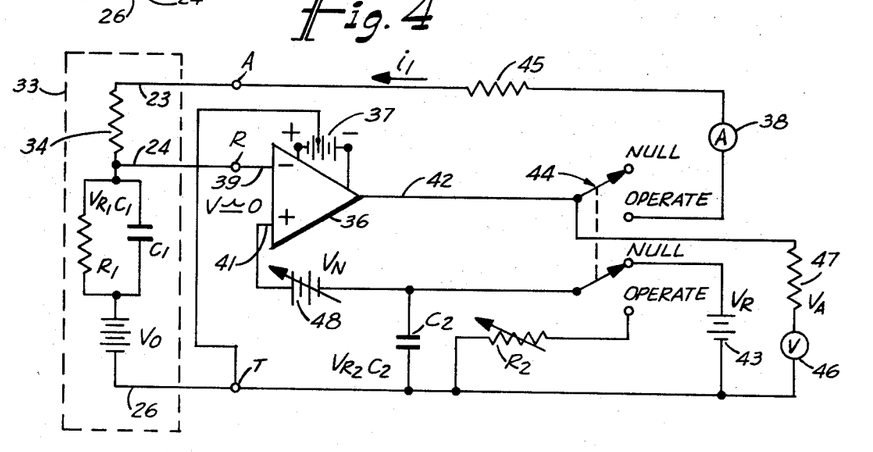
FIG. 4 is a schematic wiring diagram of one embodiment of the meter of this invention.

Referring to FIG. 4, there is illustrated a meter of the present invention for measuring electrical characteristics of the electrical load which includes resistance and capacitance. The load 33 is represented by the electrical components within the dashed line. The load 33 may be, for example, solution resistance 34 of the corrodent between the electrodes 18 and 21, and also the "polarization" resistance R and "polarization" capacitance C associated with films 27 or 28 about the electrode 21. A potential generating source, including a current supply means such as battery 37, is provided by amplifier 36 for passing current $i_1$ through a current loop circuit to the electrical load 33. The amplifier 36, in response to an electrical input signal, adjusts the magnitude of current flow in this circuit. Current flow from the amplifier 36 produces a polarization voltage which changes exponentially in the load 33 with a time constant of $R_1C_1$. Control means, including a signal generating source, provide an electrical signal to the amplifier 36. The signal changes exponentially from a first value to a second value with the RC time constant characteristic of the load 33 until a predetermined voltage is generated in the load by current flow of substantially constant value. Means, such as the ammeter 38, in the current loop circuit, provide a read-out of the constant value of current flow indicative of the electrical characteristics of the load 33 while the signal is changing exponentially. Thus, the circuitry of FIG. 4 may be employed for measuring the electrical characteristics of any load, but is particularly suited for the use in electro-chemical techniques for determinations with two or more electrodes.

More particularly, the conductors 23, 24 and 26 of the probe 17 may be considered to be connected to the terminals A, R and T of the circuitry illustrated in FIG. 4. The amplifier 36 may be a differential amplifier which has first (negative) and second (positive) inputs 39 and 41 and a common output 42. A battery 37 is connected conventionally to proper terminals of the amplifier 36 with a current return to terminal T. The differential amplifier 36 is arranged for high gains, e.g. 50,000–100,000, with associated circuitry, to provide an output current in response to an input voltage signal for producing a constant current flow in the current loop circuit.

A current loop circuit is formed between the first input 39 and common output 42 of the differential amplifier 36 (which includes the battery 37 as a source of direct current) so that measurable polarizing current $i_1$ can be passed between the test specimen electrode 21 and the electrode 18. An ammeter 38 provides a read-out of current flow in this circuit. The resistor 45 serves to limit current magnitudes in the current loop circuit to some value not injurious to the films surrounding the electrode 21. The polarizing current $i_1$ is regulated, by the input signal to the amplifier 36, in an amount sufficient for polarizing the electrode 21 a predetermined voltage amount so that the determination of the rate of corrosion occurs in a linear range of polarizing voltages. This criterion is discussed in U. S. Pat. No. 3,406,101. The current flow, irrespective of magnitude, produces a polarization voltage which changes exponentially at the test specimen electrode 21 with a time constant of $R_1C_1$.

A voltage loop circuit is provided from terminals R and T between the test specimen electrode 21 and the reference electrode 19 with the second input 41 of the differential amplifier 36. A voltage signal means is provided in the voltage loop circuit to generate a voltage signal on the voltage loop circuit. The signal changes exponentially from a first value to a second value with the time constant $R_1C_1$ associated with the test specimen electrode 21. The voltage signal means may be provided by variable resistor $R_2$ and shunting capacitor $C_2$. A source of reference polarization potential $V_R$, such as provided by the battery 43, is applied to capacitor $C_2$ until the impressed signal voltage is substantially $V_R$, at which time the battery 43 may be disconnected from the capacitor $C_2$. The magnitude of the reference voltage $V_R$ from the battery 43 may be any desired amount. However, it is preferred to use a reference $V_R$ (relative to the electrode 19) of between about 5 and about 25 millivolts and preferably about 10 millivolts for best results in corrosion rate measurements. The reference voltage $V_R$ stored in the voltage signal means (resistor $R_2$ and capacitor $C_2$) is applied to the second input 41 of the amplifier 36.

Obviously, with the battery 43 disconnected from its shunting position with capacitor $C_2$, the voltage signal applied to the input 41 decays exponentially with the time constant of resistor $R_2$ and capacitor $C_2$. The time constant of variable resistor $R_2$ and capacitor $C_2$ is adjusted to substantially the same value as the time constant of load resistance $R_1C_1$. It will be apparent that a certain constant value of current $i_1$ in the output 42 of the amplifier 36 produces a polarization voltage change about the test specimen electrode 21 that is the exponential function of the time constant $R_1C_1$. The voltage signal applied to the input 41 of the amplifier 36 is equal to this polarization voltage change about the electrode 21 which is applied to input 39 of amplifier 36. As a result, the combined input signals across inputs 39 and 41 of the amplifier 36 remain constant in value (usually zero) in the voltage loop circuit when a certain constant value of current $i_1$ flows to polarize the electrode 21 in the exponential function of the time constant $R_1C_1$. Any unbalance in the combined input signals across the inputs to the amplifier 36 produces a required change in the output current sufficient to adjust the polarization voltage change that returns the combined input signals to a constant value.

The polarization voltage change about the electrode 21 will reach eventually the value of the potential generating source. In the present embodiment, this ultimate potential magnitude is the reference voltage $V_R$, but obviously, it can be some function of the reference voltage $V_R$ depending upon the operating parameters of the amplifier 36, especially its circuit gain. Thus, the voltage signal (from the resistor $R_2$ and capacitor $C_2$) applied to input 41 of the amplifier 36 produces a current flow in the current loop which has a certain constant value $i_1$ to cause a polarization voltage change to be generated exponentially across resistance $R_1$ and capacitance $C_1$ which in function is equal to the exponentially changing voltage signal from the resistor $R_2$ and capacitor $C_2$. The parameters about the amplifier 36 under these circumstances produce a zero current in the voltage loop circuit.

The ammeter 38 can be calibrated to provide a read-out of corrosion rate since the rate of corrosion is a function of the current $i_1$ which reflects the rate of corrosion occurring at electrode 21. The ammeter 38 provides an immediate read-out of the constant value of current flow in the current loop circuit between the test specimen electrode 21 and the electrode 18 while the signal to amplifier 36 is changing exponentially. As described in U. S. Pat. No. 3,406,101, the magnitude of current $i_1$ can be correlated to the electro-chemical characteristics and also the rate of corrosion occurring at test specimen electrode 21 of known dimensions.

Switching means are provided in the meter of FIG. 4 so that the amplifier 36 may be nulled before being operated for an immediate reading of the certain constant value of current $i_1$ required to polarize the test electrode 21 in a desired amount. For this purpose, a double-pole, double-throw switch 44 is provided in the current and voltage loop circuits. The switch 44 in a first (upper) position (as shown in FIG. 4) arranges the circuitry so that the amplifier 36 may be nulled. In the null position, the switch 44 applies the reference voltage $V_R$ to the capacitor $C_2$. This voltage reference $V_R$ is stored in the capacitor $C_2$. At the same time, the switch 44 connects the common output 42 of the amplifier 36 through a voltmeter 46 so that the voltage signal output of the amplifier 36 can be monitored. Preferably, a high impedance resistor 47 is connected in series with the voltmeter 46 to maintain current flow in the current loop circuit of the differential amplifier 36 within its operational limits. The amplifier 36 can be nulled by any suitable circuit adjustments in the voltage loop circuit for a minimum output signal on the voltmeter 46.

The electro-chemical reaction about the electrode 21 produces by a half-cell effect, a small offset voltage $V_O$ associated with the electrode 21. The offset voltage $V_O$ in the load 33 is in series with the test electrode 21. Thus, the offset voltage $V_O$ appears as a voltage signal in the voltage loop circuit applied between the inputs 39 and 41 of the amplifier 36 which could produce a small current flow in the amplifier 36. However, a source of nulling voltage $V_N$, such as a battery or adjustable potential source 48, is provided in series with the voltage signal means. The nulling voltage $V_N$ is adjusted until the voltage signals applied between the inputs 39 and 41 of the amplifier 36 approach essentially zero differential with the reference voltage $V_R$ stored in capacitor $C_2$. The voltmeter 46 indicates essentially zero voltage signal output $V_A$ when the nulling voltage $V_N$ is properly adjusted.

After nulling voltage $V_N$ is properly adjusted, the switch 44 is placed into its second (lower) position or "operate" position. The reference voltage $V_R$ stored in capacitor $C_2$ immediately begins decaying exponentially as $V_{R2C2}$ with a time constant $T_2=R_2C_2$ which is substantially equal to the polarization voltage change which rises exponentially as $V_{R1C1}$ in the load 33 with a time constant $T_1=R_1C_1$ provided by resistance $R_1$ and capacitance $C_1$ associated with the test electrode 21. As a result, the voltage signals are summed to zero at the inputs of the amplifier 36 which produces current flow through the common output 42 at a constant value. This value of current $i_1$ is that magnitude precisely required to produce a polarization voltage change exponentially at the electrode 21 with a time constant $T_1=R\epsilon_1$ The electrical parameters involved in the circuitry illustrated in FIG. 4 may be readily appreciated by analyzing the voltage signals present in the voltage loop circuit for operation with the switch 44 in the null, and then, in the operate positions. When the switch 44 is placed in the "null" position the nulling voltage $V_N$ is adjusted to make the current $i_1=0$ in the output 42 of the amplifier 36 while capacitor $C_2$ is charged to a voltage $V_{C2}$ substantially equal to reference voltage $V_R$.

At this time, the voltage signal $V_A=0$ in the voltmeter 46 results in the following steady state relationship wherein $V_{R1C1}$ is the polarization voltage at electrode 21.

$V_O + V_{R1C1} = V_N + V_R$ since $V_{R1C1} = 0$ for steady state because $i_1 = 0$ in the output 42 of amplifier 36;   (1)

then $V_O = V_N + V_R$;   (2)

or $V_N = V_O - V_R$ for steady state "null" with $V_A = 0$ in voltmeter 46   (3)

When the switch 44 is placed in the "operate" position, the capacitor $C_2$ is disconnected from the battery 43 (source for reference voltage $V_R$) and starts discharging exponentially as $V_{R2C2}$ with a time constant of $T_2=C_2R_2$. The polarization voltage change $V_{R1C1}$ across resistance $R_1$ and capacitance $C_1$ at electrode 21 follows the signal voltage change $V_{R2C2}$ from resistor $R_2$ and capacitor $C_2$ since the amplifier 36 must supply the constant current $i_1$ in the current loop circuit to bring the signals across inputs 39 and 41 to essentially zero differential. This result occurs when time constants $T_1$ and $T_2$ are substantially equal, and then, the correct current $i_1$ is produced at a constant value from amplifier 36.

Figure 5:
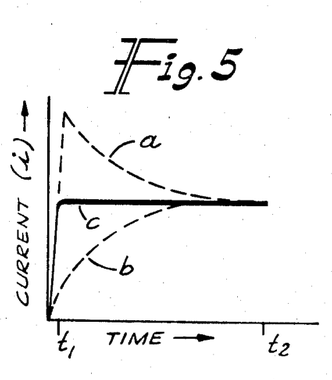
FIG. 5 is a graph illustrating several current flows imposed upon a test electrode by the circuit of FIG. 4.

It will be known whether to increase or decrease $T_2$ by adjusting resistor $R_2$ from observing the current $i_1$ on the ammeter 38. A graphic representation of the current $i_1$ reflected by several values of time constant $T_2$ is shown in FIG. 5 wherein the current $i$ in the current loop circuit is plotted against time $t$. Curve $a$ illustrates time-varying current $i$ which initially overshoots its ultimate steady state value at time $t_2$ when the time constant $T_2$ is smaller than $T_1$. Curve $b$ illustrates time-varying current $i$ which initially undershoots its ultimate value at time $t_2$ when the time constant $T_2$ is larger than $T_1$. Curve $c$ illustrates the correct current $i_1$ with an immediate rise at time $t_1$ to a substantially constant value (with no overshoot or under shoot) when time constants $T_2$ and $T_1$ are equal. For all practical purposes, the current $i_1$ in Curve $c$ is at a constant value for the entire measurement period between times $t_1$ and $t_2$.

The polarization time constant $T_1$ yields much valuable information, to the electrochemist, about the thickness and composition of the polarization film or layer about the electrode 21. The "polarization resistance" can be readily measured by well known techniques and allows determination of the "polarization capacitance" since: $C_1=T_1/R_1$.

Referring to FIG. 5, the polarizing current $i_1$, at its proper value as in Curve $c$, has a square-wave function. The current rises immediately at time $t_1$ to a constant value for all practical purposes. However, if the current $i$ is at a different value as in curves $a$ or $b$, it ultimately will reach, at time $t_2$, the same current magnitude as in Curve $c$. However, a considerable amount of time $t_2-t_1$ can be required under these conditions for the current to reach the ultimate constant value. The particular length of time depends upon the time constant $T_1$ of the load 33. For example, a period of several hours as illustrated by time $t_2$ may be required for the current $i$ to reach an ultimate constant value where the time constant $T_2$ is different in magnitudes from $T_1$. When the time constants $T_2=T_1$, the current flow $i_1$ is at constant value for practical purposes from its initial application in the current loop circuit, while the polarization and signal voltages are changing exponentially, and also, for all time periods thereafter. Thus, the present invention provides a meter which gives practically instantaneous readings of a current flow $i_1$ representative of the electrical characteristics and corrosion rate even when the test electrode 21 has considerable resistance and capacitance effects. Since corrosion is a dynamic phenomenon, it is important to make corrosion rate readings as quickly as possible before a change in corrosion conditions occurs at the test electrode 21. For this reason, the corrosion ratemeter of the present invention has great utility.

Additionally, the meter of the present invention produces corrosion rate measurements where the test specimen electrode 21 has substantial parallel capacitance as part of its reactiveness. Under such situations, large magnitudes of current could flow through the current loop circuit and thereby change radically the character of the layer or film about the electrode 21. However, the meter of the present invention may be readily adjusted to the proper current flow without such excessive currents flowing into the layer about the electrode 21. Under such situations, the resistor $R_2$ is adjusted so that the time constant $T_2$ is much larger than $T_1$. Thus, the current $i$, as in Curve $b$, rises gradually from zero towards its ultimate constant value. The time constant $T_2$ is progressively reduced through a series of tests until the time constant $T_2$ is equal to the time constant $T_1$. At such time, the current $i_1$ in the current loop circuit rises immediately to a constant value with a square-wave function.

The polarization capacitance $C_1$ can be readily determined since the capacitance $C_1$ is equal to the time constant $T_1$ divided by the resistance $R_1$. Since the polarization capacitance $C_1$ is a function of the thickness of the film surrounding the electrode 21 and is dielectric in character, the meter of FIG. 4 can be calibrated by current $i_1$ into capacitance $C_1$ values to determine film thicknesses. For any given corrodent with a relatively constant polarization resistance $R_1$, the film thickness will vary proportionally with the polarization capacitance $C_1$ about the test specimen electrode 21.

The meter illustrated in FIG. 4 may be employed with a "fixed" voltage signal generating means in the voltage loop circuit. For example, several preset combinations of the capacitor $C_2$ and resistor $R_2$ may be employed for this purpose. In such an arrangement, the time constant $T_2$ of these combinations can bracket the time constant $T_1$ associated with the test specimen electrode 21. A selection of the nearest approximate $T_2$ value of time constant to $T_1$ may be employed for effecting measurement where the current $i_1$ rises as in Curve $c$ of FIG. 5 for practical purposes.

The operating parameters of the circuit shown in FIG. 4 are arranged by the various electrical components in the current and voltage loop circuits to provide the desired results heretofore described. More particularly, the voltage loop circuit is arranged so that the inputs 39 and 41 are held at a substantially zero voltage signal differential under all operating conditions since $V_N=V_O-V_R$ parameters exist. As the signal voltage change $V_{R1C1}$ occurs in resistance $R_2$ and capacitance $C_2$, the amplifier 36 provides that certain magnitudes of current $i_1$ in the current loop circuit which maintains substantially zero voltage signal differential at inputs 39 and 41. This condition is maintained while the test specimen electrode 21 reaches its predetermined polarization voltage thereafter even though the signal voltage $V_{R2C2}$ becomes substantially zero. As a result, the amplifier 36 operates at the present voltage signal differential level at the inputs 39 and 41 to produce a current $i_1$ of certain constant value when the time constants $T_1$ and $T_2$ are substantially equal.

Figure 6:
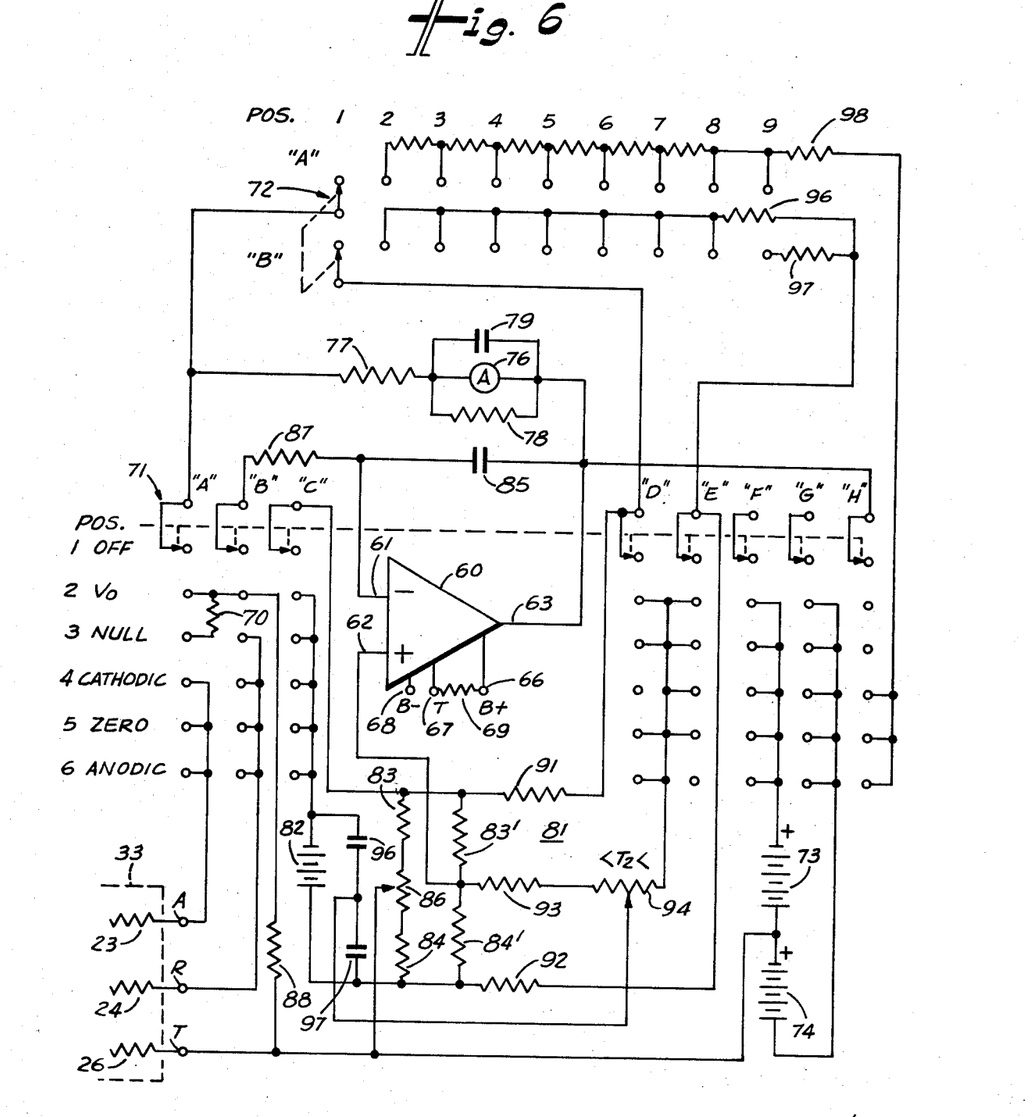
FIG. 6 is a schematic wiring diagram of a preferred embodiment of the meter of this invention adapted for making cathodic and anodic current-flowing measurements.

Referring to FIG. 6, there is illustrated another embodiment in a meter of the present invention which provides measurement of corrosion rates at either cathodic or anodic current conditions, and also readouts of the offset voltage $V_O$ existing at the test specimen electrode 21. This embodiment is basic in function to the one shown in FIG. 4 but permits greater facility in making corrosion rate measurements.

The meter includes terminals A, R and T connectable to conductors 23, 24 and 26, respectively, for suitable interconnection to the probe 17 illustrated in FIG. 1. A differential amplifier 60 has a first (negative) input 61 and a second (positive) input 62 and a common output 63. Terminals 66, 67 and 68 on the amplifier 60 provide connections to a source f power (batteries) with a conventional "trim" system including a trim resistor 69 shunting terminals 66 and 67.

A multi-position, multi-throw switch 71 having decks A, B, C, D, E, F, G and H allows ready interconnection of various associated circuits with the amplifier 60 for controlling its functional operation. In addition, a second multi-position, multi-throw switch 72 controls (1) the feedback between the input 61 and the output 63 of the amplifier 60 and (2) calibrating the read-out means associated with the amplifier 60 for the various ranges of corrosion rate to be monitored.

A current loop circuit is provided between the first input 61 and the common output 63 and includes a direct current supply means, such as batteries 73 and 74, for passing a measurable polarizing current between the auxiliary or third electrode 18 and the test specimen electrode 21 in an amount sufficient for polarizing the electrode 21 a predetermined amount. The current loop circuit is completed through the switch 71 at decks A, B, C, F and G. The current flow from the output 63 of the amplifier 60 passes through a read-out means, such as ammeter 76, and a high-current limiting impedance, such as resistor 77, through the switch 71 at positions 4, 5 and 6 in deck A to the conductor 23 at terminal A and thence via the corrodent to the electrode 18. The current loop circuit continues from the electrode 21 through the conductor 26 at terminal T, and thence through the switch 71 at positions 2 through 6 in deck C to the direct current source means provided by batteries 73 and 74. The ammeter 76 is shunted with a resistor 78 and a capacitor 79 serving as an AC frequency filter to signals in the output 63 of the amplifier 60.

A voltage loop circuit includes connection to the conductor 24 at terminal R and the electrode 19 through the switch means 71 at deck B to the first input 61 of the amplifier 60. Additionally, the voltage loop circuit includes a connection to the conductor 26 at terminal T and the test specimen electrode 21, and thence through a voltage signal means to the second input 62 of the amplifier 60. The voltage signal means is designated generally by the numeral 81.

More particularly, the voltage signal means 81 is comprised of a source of nulling voltage $V_N$, a source of reference voltage $V_R$, and a circuit comprised of resistance R and capacitance C, which circuit can be adjusted to a wide magnitude of time constants $T_2$ that encompass in values the time constant $T_1$ of $R_1C_1$ provided by the electrode 21 associated with the probe 17. The voltage signal means 81 has a bridge arrangement of resistances connected to a source of potential so that the amplifier 60 can be nulled and then also calibrated for either cathodic or anodic measurements of electrical characteristics and corrosion rate of varying magnitudes. A battery 82 in the bridge provides a source of potential both for the voltage reference $V_R$ and for nulling voltage $V_N$ for the amplifier 60. The battery 82 connects through the switch 71, in decks B and C at position 3, across the inputs 61 and 62 of the amplifier 60. A network of fixed resistors 83 and 84 are placed in series with a variable resistor 86 and form a bridge with fixed resistors 83' and 84'. With the switch 71 set at position 3 (null), the voltage signal means 81 is bridged at decks D and E so only nulling voltage $V_N$ appears at the input 62 of the amplifier 60. Adjustment of the resistor 86 moves the voltage signal level at the inputs 61 and 62 of the amplifier 60 voltage-wise relative to the freely corroding potential $V_O$ of the test specimen electrode 21 until the relationship $V_O = V_N + V_R$ is obtained. The voltage output signal of the amplifier 60 is monitored for a substantially zero value in the ammeter 76 for the nulling operation as the resistor 86 is adjusted. Thus, the inputs of the amplifier 60 are adjusted to substantially zero voltage signal differential across the inputs 61 and 62. A resistor 69 shunts the terminal A to the terminal T so that potential effects of the auxiliary or third electrode 18 are avoided during nulling operations.

The freely corroding or offset potential, $V_O$, at the test specimen electrode 21 can be determined by placing the switch 71 into position 2 after the circuit has been nulled. In such position, the current loop circuit connects directly to input 61 of the amplifier 60. A resistor 68 shunts the resistivity of the test electrode 21. The voltage difference across resistors 83 and 84 (by nulling adjustment of the resistor 86) produces a proportionate current flow through a calibrating resistor 87 which applies an unbalancing signal voltage to the input 61. The amplifier 60 responds to this unbalancing signal voltage by producing a current flow representative of the offset potential $V_O$ of the test specimen electrode 21 which produces a read-out in ammeter 76. Selection of a proper value of resistor 87 will make the ammeter 71 read offset voltage $V_O$ directly in millivolts.

In some instances, it may be desirable to operate the meter under conditions of input voltage signal conditions to the amplifier 60 other than those occurring in the null mode. For example, the amplifier 60 can be operated with a certain differential input voltage signal (not zero) so that electro-chemical measurements are made with some predetermined initial polarization potential established at the test electrode 21. For this purpose, the switch 71 is placed in position 5 which interconnects the several electrodes at the terminals A, R and T to the input and output circuitry of the amplifier 60. The voltage signal means 81 are bridged by interconnection at decks D and E. At this time, the resistor 86 is adjusted until the ammeter 76 reflects (in millivolts) the desired differential signal voltage applied between inputs 61 and 62 of the amplifier 60. Then, measurements made with the switch 71 in positions 4 or 6 will represent input voltage signal differentials according to the relationship of $V_O \pm V_K = V_N + V_R$ wherein $V_K$ is the desired differential voltage signal unbalancing the inputs 61 and 62 of the amplifier 60. Thus, measurements are made wherein the test specimen electrode 21 is biased by a supplemental polarizing potential $\pm V_K$ in addition to the freely corroding or offset potential $V_O$. This arrangement permits varying situations of polarization potentials and broadens the capabilities of the present meter in undertaking electro-chemical studies.

After the circuitry is either nulled in position 3, or "-zero" adjusted in position 5, the electro-chemical characteristics or corrosion rate of the test specimen electrode 21 can be measured cathodically or anodically. The switch 71 is placed in positions 4 and 6 for cathodic and anodic measurements, respectively, of corrosion rate occurring at the electrode 21. The voltage signal means 81 become completely effective since the shorting conditions at decks D and E in positions 2, 3 and 5 do not occur.

The voltage signal means 81 includes electrically time constant determining resistances which are balancing resistors 91 and 92, and a fixed ranging resistor 93, and a variable resistor 94 interconnected with fixed values of bridging capacitors 96 and 97 shunt connected across battery 82. The common terminal of these capacitors is connected to the variable arm of the resistor 94. The capacitors 96 and 97 are connected across the resistors 83' and 84' through deck C when switch 71 is at positions 2–6.

With the switch 71 at position 4, the bridge arms are unbalanced by resistance added between variable resistor 94 and balancing resistor 91. As a result, current flows from the battery 82 in the unbalanced bridge arms which generate a signal voltage across the capacitors 96 and 97 and resistors 83' and 84' forming an RC circuit. This signal voltage is applied to input 62 of amplifier 60. The signal voltage changes exponentially from a first value to a second value with a time constant $T_2$ adjustable by resistor 94. The voltage signal also changes in polarity such that the current flow in the amplifier output 63 produces a polarization voltage change at electrode 21 which will be cathodic. Thus, a corrosion rate measurement effected under these conditions may be termed "a cathodic corrosion rate."

With the switch 71 at position 6, the bridge arms are unbalanced by resistance added between variable resistor 94 and balancing resistor 91. As a result, a signal voltage is generated in the bridge arms by current flow from the battery 82 across the capacitors 96 and 97 and resistors 83' and 84' forming an RC circuit. This signal voltage is applied to input 62 of amplifier 60. The signal voltage changes exponentially from a first value to a second value with a time constant $T_2$ adjustable by resistor 94. The voltage signal also changes in polarity such that current flow in the amplifier output 63 produces a polarization voltage change at the electrode 21 which will be anodic. Thus, a corrosion rate measurement under these conditions may be termed "an anodic corrosion rate."

The values of the resistors in the signal generating means 81 are selected such that the signal voltage change from a first value to a second value will provide a desired polarization voltage change at the electrode 21. For example, there may be produced a voltage change of from about 5 to about 25 millivolts, but preferably 10 millivolts, relative to the reference electrode 19.

The switch 72 provides circuit means so that the ammeter 76 will have full scale read-outs over a plurality of ranges of corrosion rate magnitudes. In deck A at positions 2 through 9, a plurality of resistors provide shunts across the ammeter 76 using deck H of the switch 71 at positions 4, 5 and 6 while making measurements in the cathodic, zero and anodic functions. These shunts provide full scale read-outs over various ranges of current reflecting the corrosion rate measurements.

The switch 72 in deck B interconnects selected resistance magnitudes to the voltage signal means 81 through the switch 71 at decks D and E. The switch 72 at position 1 in deck B permits application of the nulling voltage $V_N$ across resistors 83' and 84' to be applied to the input 62 of the amplifier 60. The switch 72 at positions 2 through 8 in deck B places the resistor 96 in parallel with one of the resistors 83' and 84'. This added resistance increases the nulling voltage $V_N$ available at the input of the amplifier 60 at extremely high rates of corrosion. In position 9 of the switch 72 (at deck B) the resistor 97 is similarly employed for extremely high rates of corrosion so that sufficiently nulling voltage $V_N$ is applied to the amplifier 60. It will be appreciated that as the corrosion rate increases in magnitude, the freely corroding or offset potential, $V_O$, present at the test specimen electrode 21 likewise increases very rapidly which increases the nulling voltage $V_N$ by the relationship of $V_N = V_O - V_R$. Thus, the switch 72 in deck B provides a means for varying the magnitude of the nulling voltage $V_N$ available to the amplifier 60 to compensate for changes in the offset potential $V_O$.

At very low magnitudes of corrosion rate, the feedback for the amplifier 60 provided by switch 72 at deck A is very small to obtain a desired high gain, preferably above about 50,000. At position 1, the feedback to the amplifier 60 is provided solely by the circuitry associated in the current loop circuit with the ammeter 76 and the impedance of a capacitor 85 which limits frequency excursions of feedback signals. The switch 72, in positions 2 through 9 at deck A, provides progressively increasing amounts of resistance in the feedback loop to the amplifier 60. Thus, in measurement of extremely high rates of corrosion rate at positions 8 and 9 only a small value of resistor 98 is required to produce a large feedback current flow to the input of the amplifier 60 to maintain uniform gain characteristics.

The operation of the meter illustrated in FIG. 6 is readily performed by operators employed for making routine corrosion rate measurements in refineries, chemical plants or the like. The operator begins with the switch 71 placed in position 1, which is the off position, and switch 72 in position 9. Then, the switch 71 is moved to position 3 and the variable resistor 86 is adjusted until the ammeter 76 has a zero, or minimum reading, showing that the current flow in the output 63 of the amplifier 60 is essentially zero. At this time, the difference between voltage signals at the inputs 61 and 62 of the amplifier 60 will be substantially zero. The switch 71 is then placed into position 4 for making cathodic corrosion rate measurements. At this time, the switch 72 will be placed into one of the positions 1 through 9 where the read-out of ammeter 76 indicates the electro-chemical characteristic or corrosion rate magnitude will reside. The ammeter 76 will indicate a current flow beginning at zero, or some minimum value, and rising to an ultimate constant value. In momentary reference to FIG. 5, if the initial current flow overshoots the constant value as in Curve a, the resistor 94 is adjusted too far to its right-hand terminal. If the initial current flow undershoots the constant value as in Curve b, the resistor 94 is adjusted too far to its left-hand terminal. Thus, the operator can repeatedly move the switch 71 between positions 3 and 4 while adjusting resistor 94 and observe the responsive current flow in the ammeter 76. When the resistor 94 is adjusted so that the voltage signal changes exponentially with a time constant $T_2$ (provided by the voltage signal means 81) substantially equal to the time constant $T_1$ associated with the test electrode 21, the ammeter 76, as in Curve c, indicates a substantially square-wave type of current flow in the current loop circuit associated with the amplifier 60. Thus, the operator obtains an immediate current reading reflecting the cathodic corrosion rate.

The operator may then place the switch 71 into position 6 and read the anodic corrosion rate. The circuit components associated with the voltage signal means 81 will be sufficiently stable for purposes of making alternately cathodic and anodic corrosion rate determinations. However, if the ammeter 76 does not indicate the current flow in the output circuit 63 of the amplifier 60 to be of a square-wave type as indicated by Curve c in FIG. 5, the resistor 94 can be adjusted until the desired current flow is obtained. Under these conditions, there will be provided a voltage signal changing exponentially from the voltage signal means 81 to the input 62 of the amplifier 60 which has the RC time constant characteristic of the test specimen electrode 21.

Various modifications and alterations in the described corrosion rate meters will be apparent to those skilled in the art from the foregoing description which do not depart from the spirit of the invention. For this reason, these changes in structure are desired to be included within the scope of the present invention. The appended claims define the present invention; the foregoing description is to be employed for setting forth the specific embodiments as illustrative in nature.

What is claimed is:

1. A meter for measuring electrical characteristics of a load including resistance R and capacitance C which comprises:
   a. a circuit including an electrical load having an RC time constant characteristic;
   b. a potential generating source including a current supply means for providing an output current in response to an electrical input signal, said potential generating source connected to said circuit whereby current flow produces an exponential voltage change in the load with a time constant of RC;
   c. control means including a signal generating source for providing an electrical signal to said potential generating source, said signal changing exponentially from a first value to a second value with a time constant RC until a predetermined voltage is generated in said load by current flow of substantially constant value from said potential generating source to said load; and
   d. means for providing a read-out of said constant value of current flow indicative of the electrical characteristics of said load while the electrical signal changes exponentially.

2. The meter of claim 1 wherein the electric signal is varied between certain first and second values by said control means whereby the voltage generated in the load changes from an initial value to said predetermined voltage.

* * * * *

UNITED STATES PATENT OFFICE
CERTIFICATE OF CORRECTION

Patent No. 3,711,770  Dated January 16, 1973

Inventor(s) Homer M. Wilson

It is certified that error appears in the above-identified patent and that said Letters Patent are hereby corrected as shown below:

Column 1, lines 62-63 and Column 2, lines 8-9, for "-test" read "test";
Column 2, lines 10-11, for "-polarization" read "polarization;
Column 2, line 49, for "larger" read "large";
Column 7, line 67, for "$T_1 = RC_1$" read "$T_1 = R_1C_1$";
Column 10, line 17, for "present" read "preset";
Column 10, line 36, for "f" read "of"; and
Column 12, line 29, for "-zero" read "zero".

Signed and sealed this 29th day of May 1973.

(SEAL)
Attest:

EDWARD M. FLETCHER, JR.  ROBERT GOTTSCHALK
Attesting Officer  Commissioner of Patents